United States Patent [19]
Gouvernelle

[11] Patent Number: 4,989,119
[45] Date of Patent: Jan. 29, 1991

[54] SOLID ELECTROLYTE CAPACITOR WITH TESTABLE FUZE

[75] Inventor: Didier Gouvernelle, Semblancay, France

[73] Assignee: Sprague Electric Company, North Adams, Mass.

[21] Appl. No.: 474,572

[22] Filed: Feb. 2, 1990

Related U.S. Application Data

[63] Continuation-in-part of Ser. No. 324,131, Mar. 16, 1989, Pat. No. 4,899,258.

[30] Foreign Application Priority Data

Dec. 19, 1989 [FR] France .......................... 89-16820

[51] Int. Cl.$^5$ ............................................... H01G 9/06
[52] U.S. Cl. .................................... 361/534; 29/25.03
[58] Field of Search ............... 361/275, 534, 539, 540; 29/25.03

[56] References Cited

U.S. PATENT DOCUMENTS

| | | | |
|---|---|---|---|
| 4,107,762 | 8/1978 | Shirn et al. | 361/534 |
| 4,224,656 | 9/1980 | DeMatos et al. | 361/534 |
| 4,720,772 | 1/1988 | Yamane et al. | 361/534 |
| 4,899,258 | 2/1990 | Gouvernelle | 361/534 |

Primary Examiner—Donald A. Griffin

[57] ABSTRACT

A solid electrolytic capacitor embedded in an electrically insulating resin block has a capacitor body fitted with two electrodes which are connected by two connecting lugs, those of the output terminals (+, −) and a fuze test. One of the connecting lugs is formed of a first section attached to one of electrodes of the capacitor body and leading outside the resin block to form the fuze test terminal, and of a second section electrically insulated with respect to first section and the capacitor body and leading outside the resin block to form a normal operating terminal. The fuze element alone establishes an electric link between the first and second sections while being surrounded by the supporting mass of thermally insulating resin reaching from one of the sections to the other, while itself being embedded in the resin.

10 Claims, 3 Drawing Sheets

SOLID ELECTROLYTE CAPACITOR WITH TESTABLE FUZE

CROSS-REFERENCE TO RELATED APPLICATION

This application is a continuation-in-part of my application Ser. No. 07/324,131 filed Mar. 16, 1989 which issued on Feb. 6, 1990 as U.S. Pat. No. 4,899,258.

BACKGROUND OF THE INVENTION

The invention pertains to the arrangement of a fuze in a solid electrolytic capacitor such as a tantalum capacitor and to an improvement to the process and to the capacitor described in my parent U.S. Pat. No. 4,899,258 issued Feb. 6, 1990.

In order to reduce the detrimental effects of a short circuit in a circuit containing one or more solid electrolytic capacitors, a fuze is integrated within these capacitors themselves while limiting any resulting dimensional increase.

It is first recalled that a solid electrolytic capacitor, in particular the type made with tantalum, mainly comprises a porous pellet (anode) from which an anode wire projects, and which is completely or partially covered with various layers in practice there are layers of dielectric/oxide, of manganese dioxide layers essentially filling the pores of the anode and forming the solid electrolyte, and a conductive layer forming the counterelectrode (cathode). This structure forms a capacitor body which is coated in an electrically insulating material after attaching lugs to the electrodes that are terminated by output terminals. This process produces very compact capacitors with a simple geometric form (cylinder or rectangular parallelepiped).

Various types of built-in fuzes for capacitors of this type are already known. For example, U.S. Pat. No. 4,107,762 describes a capacitor in which the lug forming the negative terminal is connected to the counter-electrode by a fuze embedded in the insulating coating. This fuze is made of a double strip of aluminum and ruthenium-palladium. In the event of a short circuit, the heating of this fuze exothermally produces an alloy of these elements and an electrical disconnection between this negative terminal and the counter-electrode. This solution, which gives satisfaction in numerous cases, has the drawback of a large variation in the effective or useful lengths of these fuzes, and therefore in the associated current thresholds.

To correct this drawback, it was later proposed, in U.S. Pat. No. 4,224,656 to use a fuze block comprising an insulating block with parallel faces through which a hole is made and a fuze wire arranged parallel to the axis of this hole, the effective length of which is therefore determined very accurately. The precision of this fuze block is improved by the fact that this effective fuze wire length is placed in a thermally insulating air pocket which prevents the heat generated in this wire due to the Joule effect from diffusing into the capacitor and delaying the disconnection of the circuit The manufacturing of such blocks is however long and delicate.

For a greater manufacturing ease and comparable performance level, the document EPO No. 232 868 proposes a fuze element comprising an insulating plate to which two geometrically very accurate disjointed conductive layers are connected by a fuze wire placed in a given location, allowing its effective length to be accurately determined. This fuze wire is coated in a thermally insulating elastic substance, such as silicon resin, in which bubbles are formed, thereby improving the thermal insulation.

It may be noted that the documents U.S. Pat. No. 4,224,656 and EPO No. 232 868 describe a calibration of the effective length of the fuze wire, using an apparently necessary additional support element during the manufacturing, so as to provide a predetermined spacing of the zones where the ends of the fuze wire should be attached.

My parent patent U.S. Pat. No. 4,899,258 mentioned above simplifies even more the integration of a fuze in a solid electrolytic capacitor, and therefore reduces the cost for a comparable performance level, by eliminating any intermediary support element inserted between the negative connecting lug and the counter-electrode. It proposed the arrangement of a predetermined effective length of a calibrated fuze wire between two electrically insulated sections of this lug, which is directly connected by one of its sections to the counter-electrode.

SUMMARY OF THE INVENTION

Very generally, this patent application proposes a solid electrolytic capacitor comprising, embedded in an electrically insulating resin block, a capacitor body fitted with two electrodes electrically connected, respectively, to two connecting lugs leading outside of the block to form anode and cathode output terminals A fuze element having a predetermined useful length is serial-connected between the capacitor body and one selected output terminal The invention is characterized in that the connecting lug comprising this selected output terminal is formed of a first section attached to one of the electrodes of the capacitor body, and a second section electrically insulated with respect to the first section and the capacitor body, and leading outside of the block to form said selected output terminal The fuze element alone establishes an electrical link between the sections and is coated with a thermally insulated rigid material support reaching from one section to the other so as to mechanically integrate them. This material support is itself embedded in a resin forming the block.

To manufacture such a capacitor with built-in fuze, parent U.S. Pat. No. 4,899,258 proposed a process according to which:

a capacitor body was fitted with electrodes:
at least one discontinuous strip connected to a reference frame is delimited by cutting in a plate and has two end sections integrated with said frame and median section connected to the reference frame by a continuous linking strip;

sections of the discontinuous strip are folded along transversal folding lines to give them a permanent form;

a fuze element is attached between the median section and one of the end sections, and this fuze element is coated in a material support made of a thermally insulating rigid resin reaching from one section to the other to mechanically connect them and form a connecting lug;

the median section is dissociated with respect to the continuous linking strip and this median section is attached, as well as the other end section forming a connecting lug, respectively, to the electrodes of the capacitor body;

this capacitor body and these lugs are coated by casting in an electrically insulating resin block; and the lugs art dissociated with respect to the reference frame.

Actually, these various aforementioned solutions have the common disadvantage of not easily allowing the integrity of the fuze to be checked, since the fuze (as is necessary for it to carry out its function) is serial-connected with the capacitor per se.

The present invention meets the objectives of my U.S. Pat. No. 4,899,258, and takes it easy to check the integrity of the fuze by embedding in an electrically insulating resin block, a capacitor body fitted with two electrodes electrically connected, respectively, to two connecting lugs leading outside of the block to form output terminals (+, −). A fuze element with a useful predetermined length is serial-connected between the capacitor body and the selected (−) output terminal, characterized in that the connecting lug comprising this selected output terminal is formed of a first section attached to one of the electrodes of the capacitor body and leading outside of the block to form a test terminal: and a second section electrically insulated with respect to the first section and capacitor body and leading outside the block to form said selected output terminal (−). The fuze element alone establishes an electrical link between these sections and is coated with a rigid or flexible thermally insulating resin material support reaching from one of the two sections to the other This material support is itself embedded in the resin forming the block.

These sections extend parallel to each other, from the fuze element which is connected to them transversely, to the outside of the block to form the test and output terminals;

the first and second lug sections have two coplanar parallel lugs connected by the fuze element;

the coplanar lugs extend perpendicularly to portions of each of said sections with which these lugs define a cavity. The material support is connected to the back of the latter:;

the fuze element is a wire with a calibrated section reaching transversely from one section to the other;

the material support is made of a resin not carbonizable at the melting temperature of the fuze element:

the material support is made of a resin polymerized under ultraviolet radiation;

the capacitor body has a porous tantalum core.

This invention also proposes a process adapted for manufacturing a solid electrolytic capacitor with a built-in fuze element, according to which:

a capacitor body is fitted with electrodes;

at least one discontinuous strip is delimited by cutting it into a plate and is connected to a reference frame and has two mainly parallel sections and a third section All three sections are incorporated with said frame, with one of the parallel sections being longer than the other;

the sections of the discontinuous strip are folded along transversal folding lines to give them a permanent form;

a fuze element is attached, before or after folding, between these end parallel sections and this fuze element is coated in a rigid or flexible thermally insulating material support reaching from one of these parallel sections to the other;

this capacitor body and part of these connecting lugs are coated by casting in an electrically insulating resin block;

these lugs are dissociated with respect to the reference frame to form terminals (+, −, test) for the capacitor.

BRIEF DESCRIPTION OF THE DRAWINGS

Objectives, characteristics and advantages of the invention will be revealed in the following description, provided as a nonlimitative illustration in reference to the attached drawings in which.

DESCRIPTION OF THE PREFERRED EMBODIMENTS

Figure 1A:
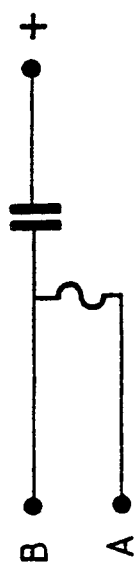
FIG. 1A is a corresponding electrical diagram of the capacitor of FIG. 1.
Figure 1:
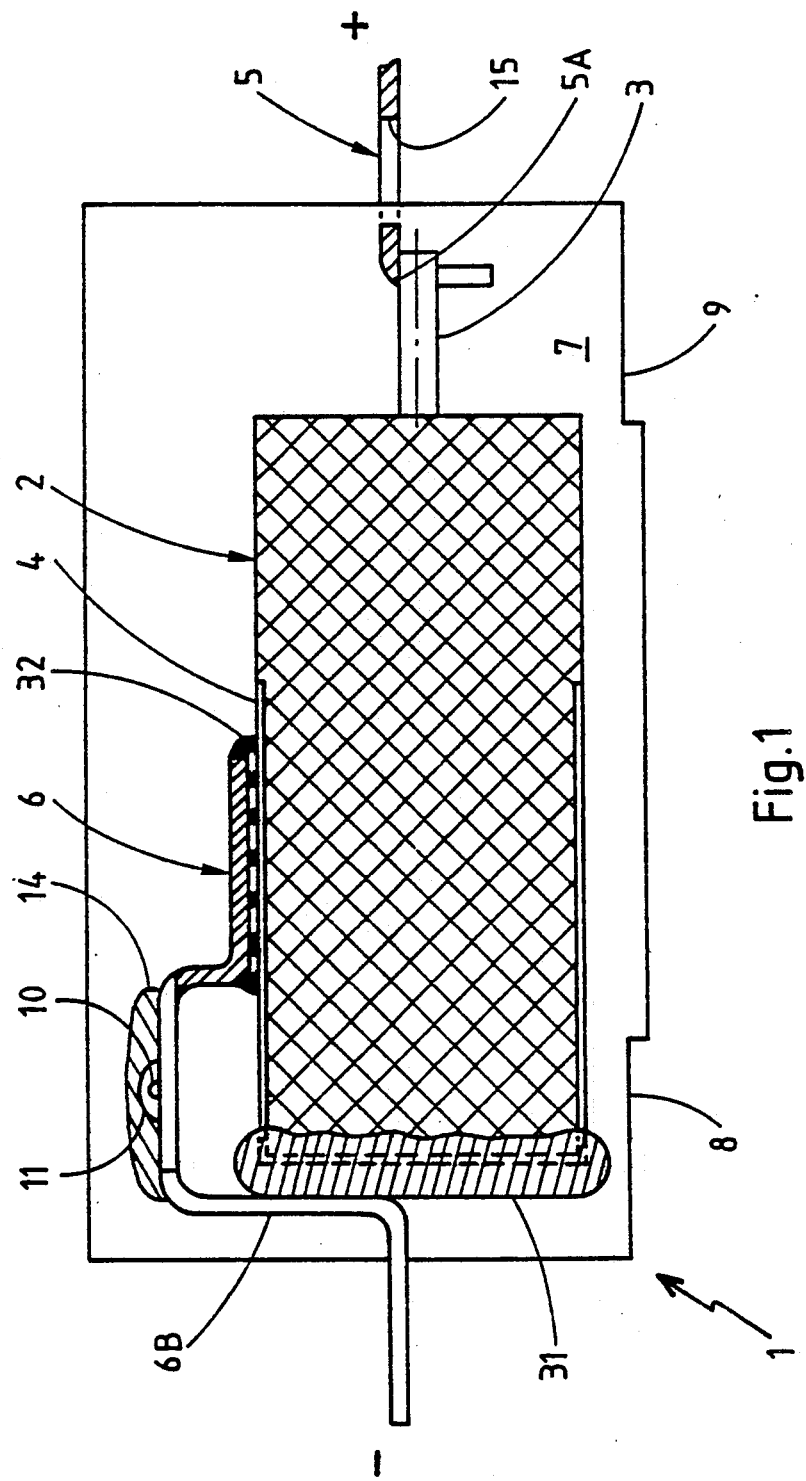
FIG. 1 is a cross-section of a tantalum capacitor comprising a built-in fuze according to this invention.

FIG. 1 shows a tantalum capacitor 1 comprising capacitor body 2 with respect from which tantalum anode rod 3 projects. This capacitor body 2 is of any known appropriate type with porous superficially oxidized tantalum core, coated over the surface with a solid electrolyte formed of manganese dioxide and partially covered with various appropriate layers, including an outer counterelectrode layer 4 electrically insulated with respect to anode rod 3.

A positive connecting conductor lug 5 is attached to anode rod 3 (in favor of notch 5A advantageously provided for this purpose), whereas one negative connecting conductor lug 6 is attached to the counter-electrode 4 layer.

The entire assembly is coated in a rectangular parallelepiped block 7 made of insulating material, in practice an epoxy resin of any appropriate type, so that the conductor lugs 5 and 6 project to form + and − output terminals. Recesses 8 and 9 are provided near opposite ridges of block 2 to allow the free ends of lugs 5 and 6A/6B to fold for most of the space of block 7.

Conducting lug 6 is actually split into two sections 6A and 6B, electrically insulated, except that a calibrated fuze wire 10 (perpendicular to the plane of FIG. 1) is attached at its ends to each of these sections, for example, by soldering, with formations of soldering zones 11. One (here 6B) of these sections extends to capacitor body 2, but both lead to the outside of block 7. Portion 6A defines negative output terminal A and portion 6B test terminal B.

This fuze wire 10 is of any appropriate type: it is, for example, a wire sold under the brand "PYROFUSE" by the PYROFUSE CORPORATION It may be an aluminum wire covered with a palladium or copper film, or a lead-tin-silver wire, or lead-silver wire in appropriate known proportions.

Sections 6A and 6B have parallel legs 12 and 13, respectively, between which a space with a predetermined constant length is provided (see FIG. 3) which determines the effective length of fuze wire 10.

This wire 10 is embedded in protective resin 14 which adheres to legs 12 and 13 on the outside of the cavity provided between parallel portions of sections 6A and 6B and whose portions 12 and 13 define the bottom. As a variant (not shown), the wire is placed inside the cavity as in my aforementioned U.S. Pat. No. 4,899,258.

This roll of this protective resin 14 essentially is to provide thermal protection of the insulating resin contained in block 7 in case the fuze wire melts under the effect of excessive intensity. This permits an accurate definition of the melting characteristics (about 400° C. up to 660° C. depending on the nature of the materials contained in the fuze wire). Preferably this appropriate resin 14 is selected not to carbonize at the melting temperature of the fuze wire, so as not to introduce residual resistance.

This thermally insulating protective resin, not carbonizable at the melting temperature of fuze 10, is for example a CHIPBONDER 360 or LID 1043 type resin.

This resin may also be similar to the resin contained in block 7. Since it is formed before said block (see below), it has in finished capacitor 1 an interface which permits its existence to be checked.

Hole 15 may advantageously be provided in lug 5 to improve the anchorage of the latter in block 7.

Figure 2:
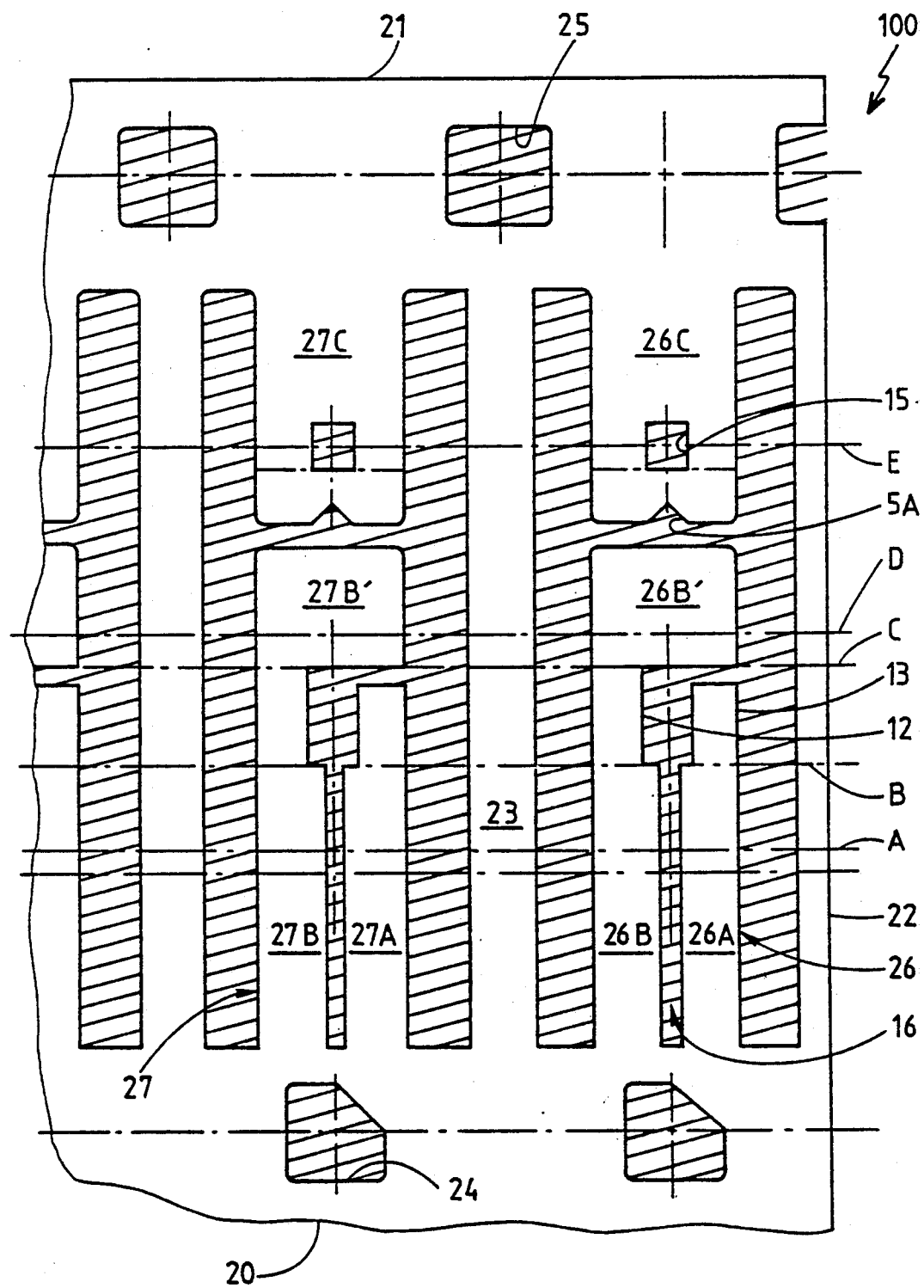
FIG. 2 is a partial top view of the plate in which the connecting lugs of the capacitor of FIG. 1 are cut out: and, FIG. 3 is a partial perspective view of the plate of FIG. 2 after the folding step and the fuze wire attachment and punching operations.
Figure 3:
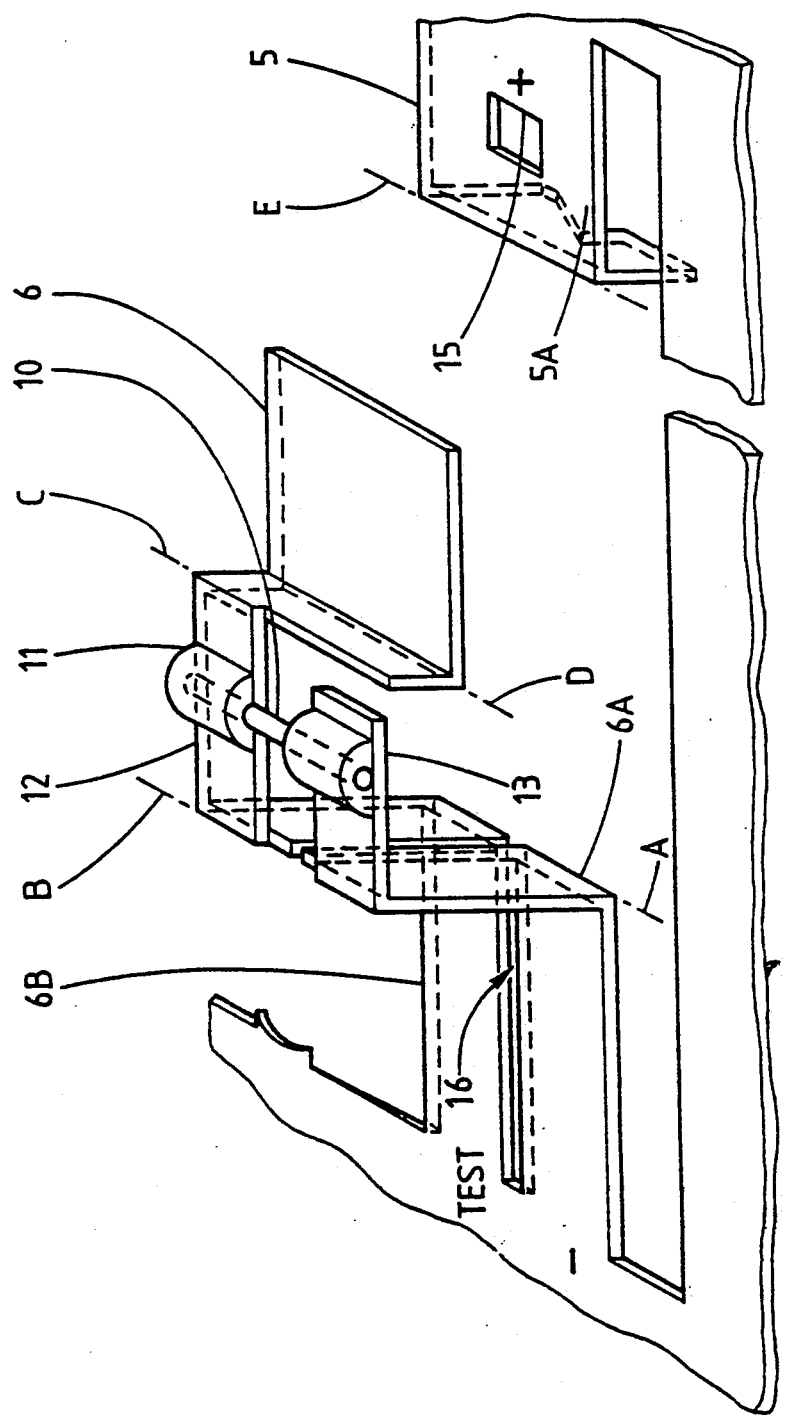

FIGS. 2 and 3 illustrate two successive phases in manufacturing capacitor 1, selected to show the details for forming lugs 5 and 6A/6B and attaching fuze wire (10).

FIG. 2 shows a portion of plate 100 made of an electrically conductive material (for example Iron-Nickel FN 42 type alloy) in which various cuts were made (crosshatched zone), by stamping for example.

This perforated conductive plate ("lead frame") has here two horizontal strips 20 and 21 integral with vertical strips 22, 23, etc. and has positioning holes 24 and 25. This arrangement is identically reproduced along horizontal strips.

A discontinuous vertical strip 26 is provided as a reference, and is composed of sections, with coplanar sides, which are used as connecting lugs 5, 6A and 6B of capacitor 1 of FIG. 1.

Accordingly strip 26 has, from horizontal strip 20 and the side of strip 22, section 26A used to form lug 6A and on the side of strip 23, section 6B used to form lug 6B.

These sections 26A and 26B are separated by slot 16 which form portions 12 and 13 of FIG. 1, then lead laterally to the right between the end of section 26A and widened head 26B' of section 26B.

This strip 26 has section 26C connected to horizontal strip 21, to form leg 5 of capacitor 1 and in which hole 15 and notch 5A of section 5 are provided.

Strip 27 to the left of strip 26 also has similar section 27A, 27B and 27C and so forth.

Slotted plate 100 is folded along folding lines A, B, C, D and E to give the desired configuration for lugs 5, 6A and 6B to the sections of strips 26 and 27. This folding is not applied to strips 22, 23 and so forth which define a reference plane, with horizontal strips 20 and 21.

The attachment is performed by soldering calibrated fuze wire 10 which extends over the entire width of strip 26 or 27. Since sections 26A and 26B are kept in a relative position by strip 20, the transversal spacing between legs 12 and 13 remains constant, equal to their spacing in the flat configuration of FIG. 2, whereas their sides are coplanar as in FIG. 2.

Protective resin 14 is then applied To make it easier to use, this protective resin 14 is advantageously a type which polymerizes under ultraviolet radiation. It is a CHIPBONDER 360 or LID 1043 type resin. It may also by an AMICON XS 2212/102 type SILICONE resin.

Capacitor body 4 is moreover prepared. The section (generally silvered) of said body facing anode rod 3 is advantageously lined with insulating layer 31 of any appropriate type to prevent any short-circuiting between this section and the vertical part of sections 6B and 6A of lug 6. As a variant, this insulating resin is directly applied to said vertical part of sections 6B and 6A.

Capacitor body 4 is then positioned at sections 6A, 6B and 5. The horizontal part of section 6B is glued to body 4, in practice, with silver glue 32, whereas lug 5 is soldered to tantalum wire 3.

Finally, the assembly of capacitor body and lugs 6A, 6B and 5 is placed between the parts of a mold using strips 20 and 23 for positioning. Resin 7 is injected, and after polymerizing the latter (in practice under heating) the capacitor is released from the mold.

This casting operation is performed for each strip 26, 27, etc. delimited by cutting out each plate 100.

Now one only has to cut the junction zones of lugs 6A and 6B at strips 20 and 21. Capacitor 1 with built-in fuze 10 is then ready to be used. The + and A ends of strips 5 and 6A are operating terminals of built-in fuze capacitor 10. The end B of strip 6B is the test terminal that can be used to check the continuity of the fuze (test to be performed between A and B).

It is understood that the foregoing description was provided solely as a nonlimitative illustration and that numerous variants may be proposed without deviating from the scope of the invention. Thus, for example, the fuze element may be provided in the positive lug. It may be placed at the end of the capacitor body and not on one side.

What is claimed is:

1. A solid electrolyte capacitor comprising a capacitor body (2) embedded in an electrically insulating resin block (7), said body (2) provided with two electrodes (3, 4) electrically connected to two connecting terminals (5, 6) leading outside said block (7) to form output terminals (+, —); a fuze element (10) with a predetermined useful length is series-connected between said capacitor body (2) and one of said output terminals (5, 6); characterized in that said selected output terminal is formed of first section (6B) attached to one of said electrodes (3, 4) of capacitor body (2) and leading outside of block (7) to form test terminal (B), and second section (6A) electrically insulated with respect to said first section (6B) and said capacitor body (2) and leading outside of block (7) to form said selected output terminal; fuze element (10) alone establishes an electrical link between said sections (6A, 6B), said fuze element (10) is coated with thermally insulating material support (14) reaching from one of said two sections (6A, 6B), material support (14) is itself embedded in said resin block (7).

2. A capacitor according to claim 1 characterized by said portions extending parallel to each other, from fuze element (10), which is connected to them transversely, to the outside of the block (7), in order to form said output test terminal.

3. A capacitor according to claim 2 characterized in that said first (6A) and said second (6B) terminal sections comprise two parallel coplanar legs (12, 13) connected by said fuze element (10), 4. A capacitor according to claim 3 characterized in that said coplanar legs (12, 13) extend perpendicularly to portions of each of said sections (6A and 6B) with which said legs (12, 13) define a cavity at the back of which material support (14) containing said fuze element (10) is connected.

5. A capacitor according to claim 4 characterized in that said fuze element (10) is a wire with a calibrated section reaching transversely from one section to the other (12, 13).

6. A capacitor according to claim 5 characterized in that said material support (14) is made of a resin not carbonizable at the melting temperature of said fuze element (10).

7. A capacitor according to claim 6 characterized in that said material support (14) is made of a resin polymerized under ultraviolet radiation.

8. A capacitor according to claim 7 characterized in that said capacitor body (2) has a porous tantalum core.

9. A process for manufacturing a solid electrolytic capacitor with built-in fuze, according to which:
- a capacitor body (2) fitted with electrodes (3, 4) is prepared:
- at least one discontinuous strip (26, 27) is delimited by cutting of a plate (100) and is connected to a reference frame (20-23) and has two mainly parallel sections (26A, 26B: 27A, 27B) and third section (26C, 27C), all three of which are integral with said reference frame, one (26B, 27B) of said parallel sections being longer than the other (26A, 27A);
- the sections of said discontinuous strip are folded along transversal folding lines (A, B, C, D, E) to give a final form;
- before or after folding, a fuze element (10) is attached between said parallel sections (26A, 26B), and said fuze element (10) is coated in material support (14) of a thermally insulating rigid or flexible resin reaching from one of said parallel sections to the other;
- said capacitor body (2) and parts of connecting sections are coated in an electrically insulating resin block (7):
- sections (5, 6A and 6B) are dissociated with respect to reference frame (20 - 23) to form terminals (+, −, test) for said capacitor.

10. A process according to claim 9 characterized in that said material support (14) is formed by exposing a resin polymerizable under ultraviolet radiation to ultraviolet radiation.

* * * * *